United States Patent [19]

Jenkins

[11] 4,403,434
[45] Sep. 13, 1983

[54] PICTURE FRAME ASSEMBLY

[75] Inventor: Robert D. Jenkins, Indianapolis, Ind.

[73] Assignees: David G. Reilich; Unipak, Inc.; Jeffrey J. Quinn, all of Indianapolis, Ind. ; part interest to each

[21] Appl. No.: 340,257

[22] Filed: Jan. 18, 1982

[51] Int. Cl.³ .............................................. G09F 1/12
[52] U.S. Cl. .................................... 40/152; 403/402
[58] Field of Search ................. 403/401, 402; 40/155, 40/152, 152.1

[56] References Cited

U.S. PATENT DOCUMENTS 3,534,490 10/1970 Herbert ................................ 40/155
3,965,601 6/1976 Nielsen ................................ 40/155
4,122,617 10/1978 Nielsen ................................ 40/155

FOREIGN PATENT DOCUMENTS 748387 4/1933 France ................................ 40/155

Primary Examiner—Gene Mancene
Assistant Examiner—Wenceslao J. Contreras
Attorney, Agent, or Firm—Woodard, Weikart, Emhardt & Naughton

[57] ABSTRACT

A picture frame made of metal extrusions of identical cross sectional shape is assembled at its corners by the use of corner plates and cam operating buttons. The plates have cam ramps formed therein and the buttons have integral cam lugs. A quarter turn with a screwdriver will tighten or loosen the assembly to close or open a corner.

26 Claims, 11 Drawing Figures

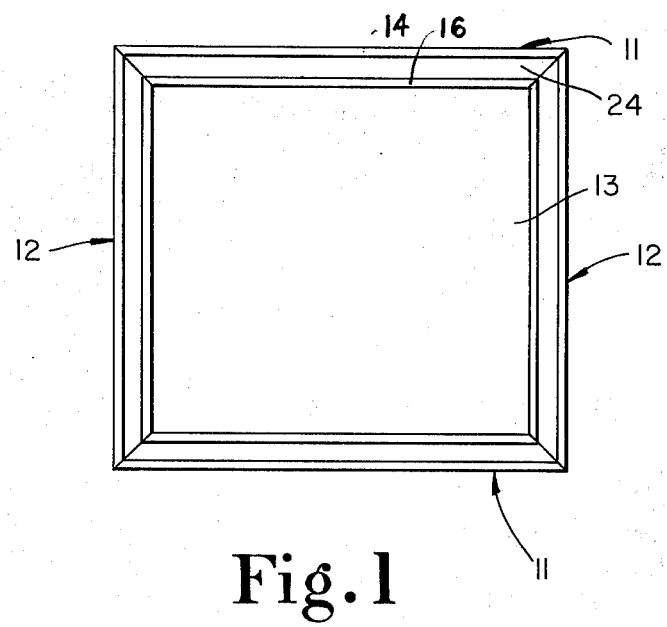
Fig. 1
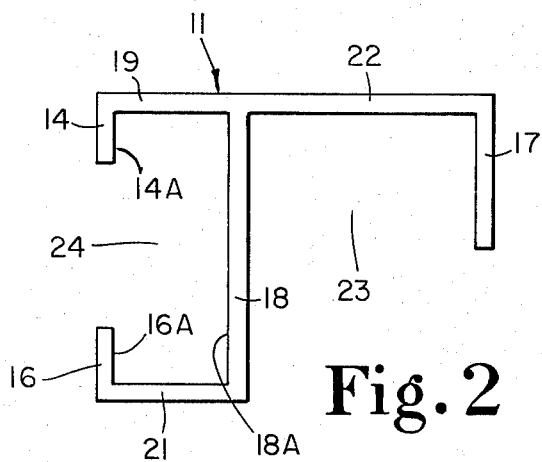
Fig. 2
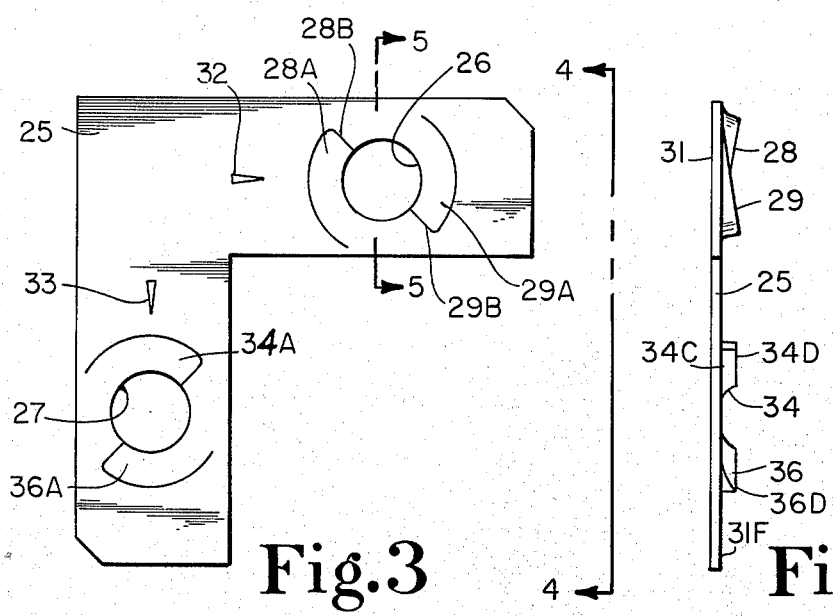
Fig. 3
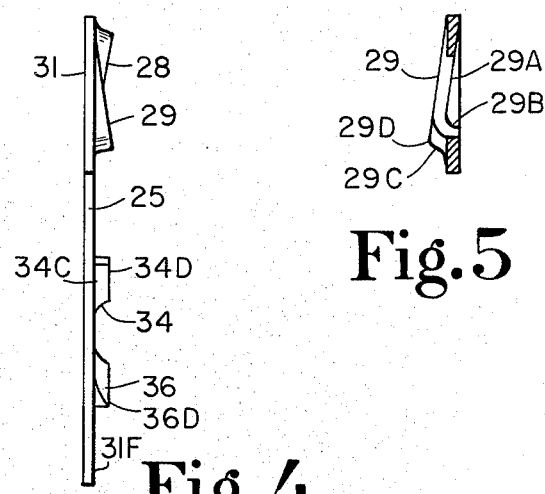
Fig. 4
Fig. 5

PICTURE FRAME ASSEMBLY

BACKGROUND OF THE INVENTION

1. Field of the Invention

This invention relates generally to picture frames, and more particularly to means facilitating assembly of metal picture frames.

2. Description of the Prior Art

The prior art has disclosed various ways of assembling picture frames. Two patents of particular interest in this regard are U.S. Pat. No. 3,534,490 issued Oct. 20, 1970 to D. P. Herbert, and U.S. Pat. No. 3,965,601 issued June 29, 1976 to Helmar Nielsen. In the former of these patents, the frame members are metal extrusions and are held together at the corners by angled members having set screws threaded therein and bearing on portions of the frame members to lock the angle members in the frame members at the corners. In the Nielsen patent, the frame members are also made of metal extrusions of a cross section similar to but slightly different from those in Herbert. In the Nielsen construction, several different types of corner pieces are employed with set screws to hold the corners together.

Although the Herbert patent discloses one way of holding extrusions together at corners to form a picture frame, and the Nielsen patent shows another way to do the same thing and, at the same time, force the corners together at the front of the frame, both have some disadvantages. One primary disadvantage can be best recognized when one considers the fact that there is a significant market for non-professionals, who wish to do their own work in framing pictures. Occasionally such individuals do not get the corners together quite adequately. The Nielsen patent represents an effort to improve the ability of an individual to make a good corner. But in one embodiment of Nielsen, where the L-shaped bearing plate 28 is used, this involves an extra piece at each of the corners, thus increasing the expense, weight, and number of pieces the user must deal with at each corner. In the other embodiments, where only one piece is used, and in the Herbert construction, the set screw bears on the aluminum frame itself. If the corner is not properly assembled the first time, and the set screw is tightened in place, it will make it difficult to ever correctly assemble the corner thereafter. The reason for this is the fact that, once tightened, the set screw normally leaves a dent in the metal. At each subsequent reassembly of the corner, the set screw tends to re-seat itself in the dent made the first time.

SUMMARY OF THE INVENTION

Described briefly, according to a typical embodiment of the present invention, a frame assembly is provided of a plurality of framing members having a generally C-shaped cross section. Connector assemblies are located at the end-to-end junctions of these members. Each connector assembly has a bearing piece with two apertures therein. One aperture faces a wall of the C in one of the members at the joint, and the other aperture faces a wall of the C in the other member at the joint. A bearing pad device is located at each of the apertures, each pad having a stem received in the aperture, and a flange portion. The large face of the flange portion provides a bearing pad face to engage with the wall of the C, while a cam lug is provided on the face of the flange opposite the large face. This cam lug engages a cam ramp formed in the connector piece. A tool receiver is provided in the end of the stem for access by a tool which, upon turning of the bearing pad device in the aperture, will cause the cam lugs to ride up the cam ramps and tighten the connector piece and bearing pad device in the frame member. In this way, the corners can be assembled and locked.

BRIEF DESCRIPTION OF THE DRAWINGS

FIG. 1 is a rear view of a picture frame assembly according to a typical embodiment of the present invention.

FIG. 2 is an end view of a typical frame member used in the assembly of FIG. 1.

FIG. 3 is a bearing face view of a corner bearing plate used in the assembly.

FIG. 4 is an edge view thereof taken at line 4—4 in FIG. 3 and viewed in the direction of the arrows.

FIG. 5 is a section therethrough taken at line 5—5 in FIG. 3 and viewed in the direction of the arrows.

DESCRIPTION OF THE PREFERRED EMBODIMENT

Figure 7:
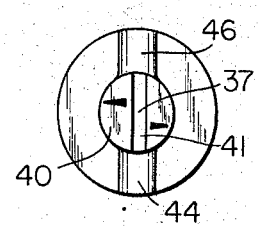
FIG. 7 is an axial view of the bearing pad.

Referring now to the drawings in detail, and particularly to FIG. 1, the picture frame assembly of FIG. 1 includes upper and lower framing members 11 and side framing members 12 mounting a picture therein with the picture backing shown at 13. All four of the framing members shown in this embodiment are of identical cross sectional shape as shown in FIG. 2 and can be made of aluminum extrusions or of other materials by appropriate processing. They are mitered at the ends as shown in FIG. 1 with the angle being appropriate to the number of sides in the frame. In the illustration, a 45° angle is used for a rectangular frame. For a hexagon or other polygonal shape, the angles would be appropriate to the particular shape.

In FIG. 1, where we are looking at the rear of the frame, one can see the rear face of each of the four framing members. As shown in FIG. 2, the rear face of member 11 is provided by spaced co-planar flanges 14 and 16 whose inner surfaces 14A and 16A provide a bearing wall in the framing member, as will be seen. The front face of the frame is provided by a front flange 17 in a plane parallel to that of the plane of the inside walls of flanges 14 and 16.

The flanges 14 and 16 are parallel to a wall portion 18 whose face 18A is parallel to and faces the walls 14A and 16A of the flanges 14 and 16. These, together with the portions 19 and 21 of the member 11, provide a C-shaped portion of the frame member. This portion cooperates with the flange 17 and portion 22 to form a channel 23 to receive the picture, backing 13 (FIG. 1) and any external covering such as glass or plastic also in channel 23 to provide protection for the front of the picture (not shown). The C-shaped portion provides a track with a rearwardly opening slot 24 therein for purposes which will soon be described. Because the cross sectional shape of all of the framing members is the same, the slot 24 extends the whole length of each of the frame members. For purposes of the present invention, it is not necessary that the track and slot be uninterrupted throughout the entire length of the members. It is shown this way, with the showing of corner connector assemblies omitted from FIG. 1, to illustrate that it is most convenient for all framing members to be of the same material with identical cross section.

Referring now to FIGS. 3, 4 and 5, FIG. 3 shows a metal plate. A convenient material is cold rolled strip steel of prime quality, one-half hard. As an example, for a frame having a nominally one-half inch wide track, the plate of FIGS. 3–5 can be stamped from a steel strip 2 inches wide and 0.050 inches thick. It has a pair of apertures 26 and 27 punched therein at the longitudinal and lateral centers of the two legs of the L-shape of the plate. The L-shaped plate is for use in frames which are rectangular. For frames of other polygonal shapes, the plate would be of an angular shape other than right angle.

At each aperture, two semicircular cam ramps such as 28 and 29 at aperture 26 are cold formed in the plate. A depression 28A is formed in the face 31 of the plate to form the cam ramp 28 in the opposite face. Similarly, a depression 28A is formed in face 31 to provide the cam ramp 29. Since this plate bears against the frame member inside walls 14A and 16A (FIG. 2) in the assembly, as a reaction against a cam force applied as will be described, the surface 31 will be called a "bearing surface" and this piece will be hereafter referred to in this description as a "bearing plate". A depression 32 is provided in the bearing surface in a specific orientation with reference to the commencement and conclusion of the cam ramps to assist the user in the assembly of the frame according to the present invention. The lines 28B and 29B at the ends of the depressions 28A an 29A, respectively, have counterpart abutments on the opposite face of the bearing plate at the "high" ends of the cams. The orientation of these is preferably 45° from the longitudinal axis of the leg of the plate in which the associated aperture is located. This relationship will be observed upon reference also to the cam ramp depressions in the bearing face 31 adjacent the aperture 27. The index arrow 33 associated with the aperture 27 and its associated cams has the same relationship to that aperture and its associated cams as the arrow 32 has with reference to the aperture 26 and its associated cams.

Reference to FIG. 5 shows, for example, where the depressions 29A ends at the end abutment 29B with the counterpart end abutment 29C at the "high" end 29D of the ramp 29. This is typical of each of the cams in this embodiment. The cams associated with aperture 27 and arrow 33 are 34 and 36 with the end of cam 34 being shown at 34C. The high point of cam 34 is at 34D and the high point of cam 36 is at 36D.

Figure 6:
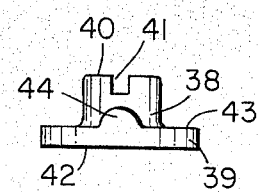
FIG. 6 is a side view of a bearing pad used in the assembly.

FIGS. 6 and 7 show a pressure pad according to the typical embodiment of the present invention. This pad is typically circular about an axis 37, and includes a stem 38 and flange 39. The stem has a tool receiver therein which is shown at 41 as a screwdriver slot. The flange 39 has a bearing face 42 which is smooth and flat across its entire face. The rear face 43 of the flange has a pair of integral radially extending lugs 44 and 46 thereon which are semi-circular in shape as shown in FIG. 6.

Figure 8:
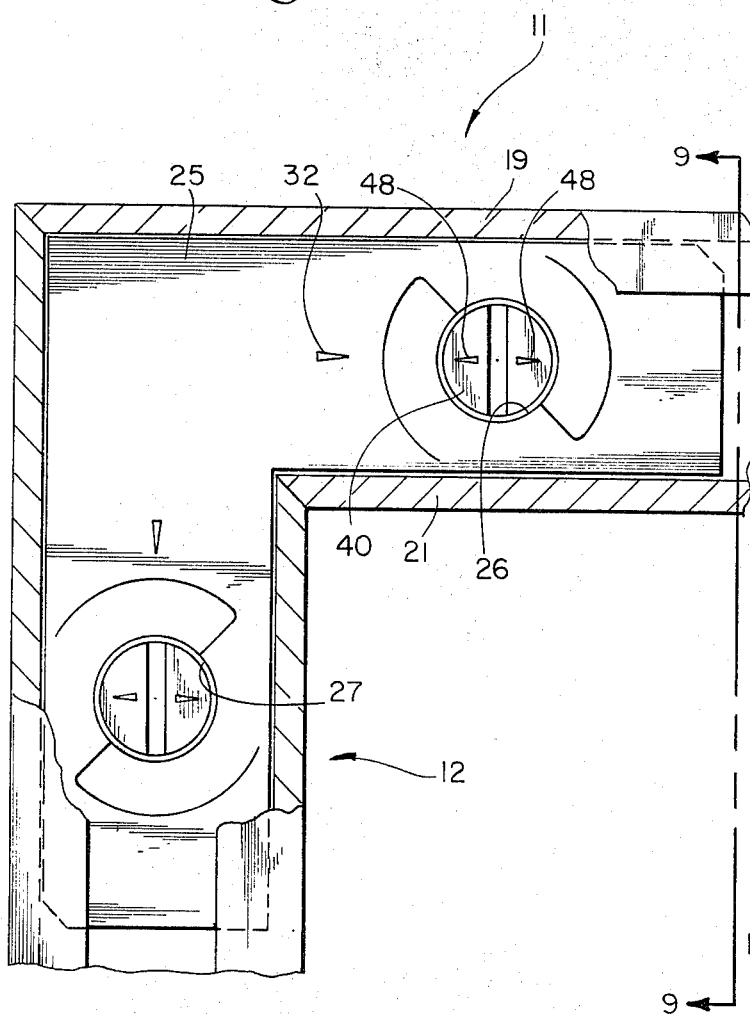
FIG. 8 is a fragmentary view of a corner portion of the frame assembly partially in section showing the bearing piece and bearing pads in place with one of the pads tightened and the other loose during the assembling of the frame.
Figure 9:
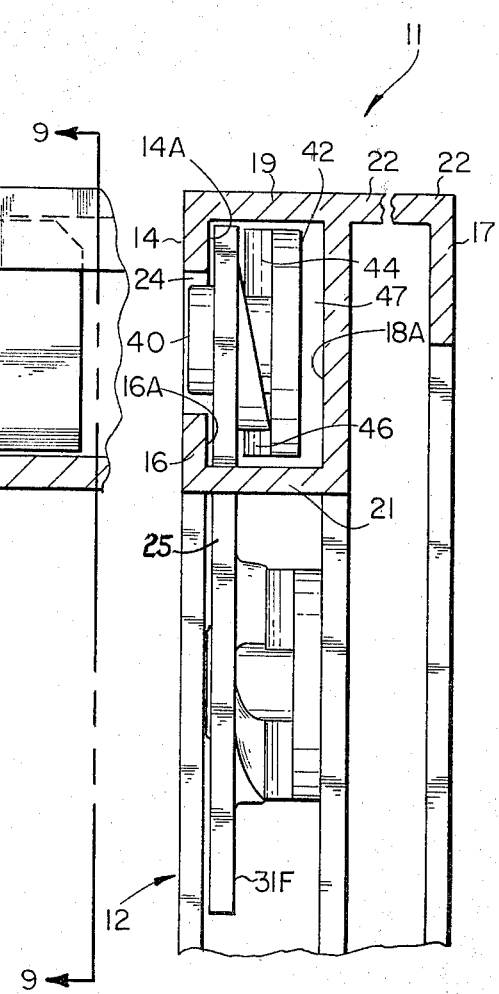
FIG. 9 is a section taken at line 9—9 in FIG. 8 and viewed in the direction of the arrows.

FIGS. 8 and 9 show two views of a corner assembly, which is typical of each of the four corners of this frame assembly of FIG. 1. The two legs of the corner bearing plate 25 are disposed respectively in the channels formed by the C-shaped portions of the framing members 11 and 12. A bearing pad device is provided at each of the two apertures 26 and 27. The stem of each such device is received in the respective aperture. In order to be able to insert the corner connector assembly in the respective C-shaped channel of the corresponding frame member, it is necessary that the bearing pad cam operating lugs 44 and 46 be away from the high points on the cams, and preferably at the commencement of the cam ramps on the free face 31F of the bearing plate 25. In this way, the bearing pad face 42 has ample clearance space 47 from the wall 18A of the framing member. The stem end 40, with the screwdriver slot 41 therein is exposed in the slot 24. To tighten the connector plate and bearing pad in the C-shaped channel or track, it is necessary only to turn the pad approximately one-quarter turn. This will cause the cam lugs 44 and 46 to ride up the cam ramps 29 and 28, respectively, until the pad 42 engages the wall 18A and forces the bearing surface 31 against the flange walls 14A and 16A. The connector assembly has already been tightened in this way in the member 12. Thus, FIGS. 8 and 9 show the connector assembly loose in the member 11 and tight in the member 12, to show the two different conditions.

In order to assist the user in assembly of the unit, to facilitate entry of the plates and bearing pads in the respective frame members, the outer end 40 of the stem of the bearing pad is provided with indicator pointers 48. There are so related to the cam lugs on the bearing pads that, when aligned with the pointers 32 and 33 on the bearing plate legs, the lugs are at the low points on the cams. This indicates a release condition. When the bearing pad pointers are located transverse to the related pointer in the associated aperture, the cam lugs are fairly high on the cam ramps.

The screwdriver slot could have a different orientation with reference to the lug such as 90° from the orientation shown, and the slot could then be used as an index indicator, instead of the pointers 48. However, other types of tool receivers such as an Allen wrench socket or Phillips screwdriver socket might also be used. In that event, a specific index indicator such as a pointer 48 would be desirable.

Figures 10, 11:
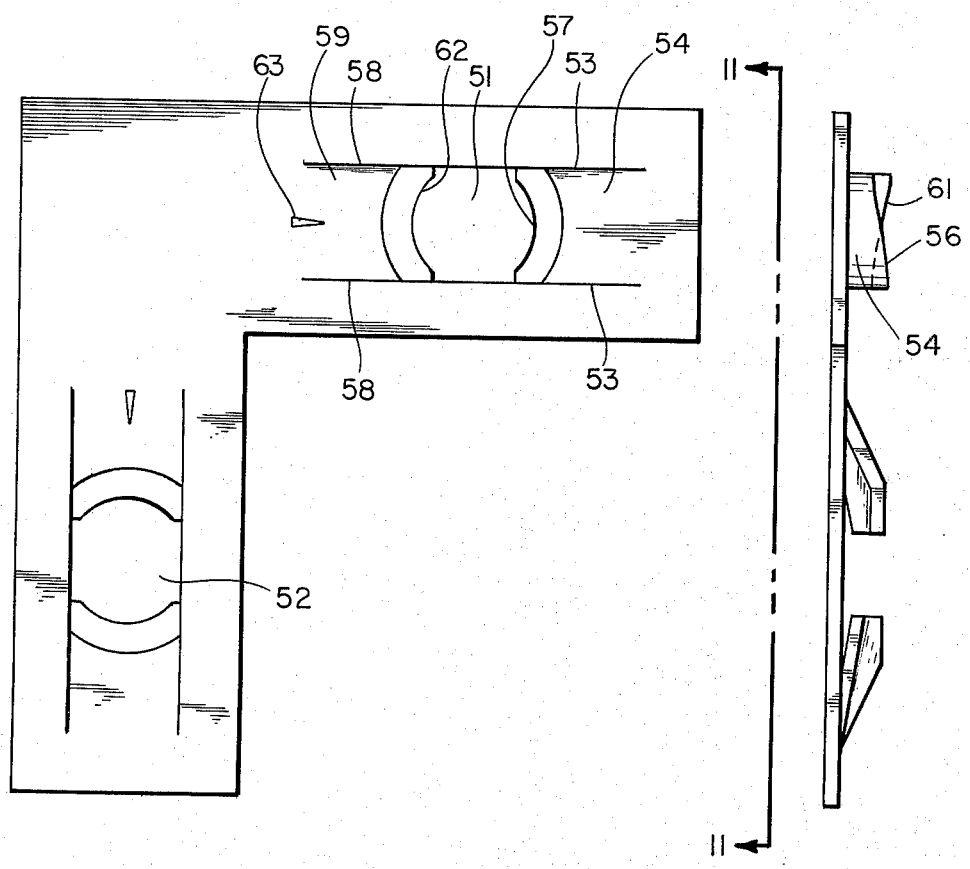
FIG. 10 is a view similar to FIG. 3 but showing an alternate construction.
FIG. 11 is a view thereof taken at line 11—11 in FIG. 10 and viewed in the direction of the arrows.

FIGS. 10 and 11 show an alternate embodiment of the corner plate. In this embodiment, instead of the cam ramps being formed as shown in the previous embodiment, forming with lancing is used. Apertures are provided at 51 and 52 in the respective legs. At each of the apertures, the material is lanced as at 53 to provide a cantilever arm 54 with a cam surface 56 at an appropriate ramp angle adjacent the bearing pad stem piloting edge 57. Similarly, the leg is lanced at 58 to provide another cantilever portion 59 with a cam ramp 61 thereon adjacent the bearing pad piloting edge 62. Appropriate orientation indicators such as 63 may be provided. The material used would be preferably high carbon spring steel. This corner bearing plate can be used in the same way as that described above with reference to the preferred embodiment.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A frame assembly comprising:
   a plurality of framing members arranged in series, with the ends of each member meeting the ends of the next adjacent member in the series at junctions, to form a frame, each of said members having a generally C-shaped cross section comprising spaced facing wall means;
   a plurality of connector assemblies, one of said connector assemblies being located at each of said junctions of frame members to connect the adjacent frame members together at the junction, each connector assembly including a bearing piece having at least two apertures therein spaced from each other and located on opposite sides of the junction between the two frame members being connected by the connector assembly at the junction, each of said bearing pieces of the connector assembly engaging one of said wall means of each of the two frame members on opposite sides of the junction and adjacent said apertures, and each connector assembly including at least two bearing pad means, each bearing pad means including a bearing pad portion engaging the other of said wall means of one of said frame members, and each bearing pad means including a locating stem received in one of said apertures of the connector bearing piece, the stem having a tool receiver therein;
   said bearing pieces and bearing pad means having cooperating cam and follower means thereon operable by a tool when received in the tool receiver of the stem of the bearing pad means to tighten and loosen the connector assemblies between the said facing wall means at the junctions.

2. The assembly of claim 1 wherein:
   said bearing pieces have said cam means therein and said bearing pad means have said cam follower means therein.

3. The assembly of claim 2 wherein:
   said cam means are a pair of ramps formed in said bearing pieces on the opposite sides of said apertures and engaging said cam follower means of said bearing pad means.

4. The assembly of claim 3 wherein:
   said cam follower means include a pair of lugs on said bearing pad means extending radially outward from said stem.

5. The assembly of claim 4 wherein:
   said bearing pad means include a flange portion having said bearing pad portion on one face thereof and said stem projecting from the other face thereof and said lugs projecting from said other face thereof.

6. The assembly of claim 5 wherein:
   said apertures and locating stems are circular and sized for fitting reception of the stems in the apertures for piloting the stems in the apertures during operation of the cam means by operating tool means in the tool receivers.

7. The assembly of claim 6 wherein:
   said bearing piece has a planar surface which engages said one of said wall means, and said cam means are arranged for advance of the bearing pad means in a direction transverse to the plane of said planar surface in response to rotation of the bearing pad means one quarter turn about its circular axis, from a condition where the bearing piece and pad are clamped tightly against the facing wall means, to the condition where the bearing piece and pad are unclamped from the facing wall means.

8. The assembly of claim 7 wherein:
   each of the framing members has a front and rear face, the rear face being provided by a pair of spaced co-planar rear flanges which form the said one wall means of the C-shape, the front face of the framing member being provided by a third flange spaced from said wall means to cooperate with a portion of the C-shape portion to receive a picture in the frame.

9. The assembly of claim 8 wherein:
   said rear flanges are parallel and, with the C-shape section, define a slotted rear track in each framing member;
   said bearing pieces are located with their apertures in alignment with the slots in the tracks, with said tool receivers facing said slots for access by a tool inserted through said slots.

10. The assembly of claim 9 wherein:
    orientation index means are provided on said planar surfaces and said stems, and oriented to show alignment upon retraction of the bearing pad means to facilitate assembling and disassembling the frame assembly.

11. The assembly of claim 3 wherein:
    at least one of said bearing pieces is planar; and
    said ramps project from a surface of said bearing piece.

12. The assembly of claim 11 wherein:
    said one bearing piece is made of cold rolled strip steel, and said ramps are pressed therein.

13. The assembly of claim 11 wherein:
    said one bearing piece is made of high carbon spring steel, lanced and shaped to form said ramps, said ramps resiliently engaging said cam follower means.

14. A joint for a frame or the like comprising:
    first and second members arranged with one end of each member meeting an end of the other member at a junction, each of said members having a generally C-shaped cross section comprising spaced facing wall means;
    a connector assembly located at said junction to connect the members together at the junction, said connector assembly including a bearing piece having at least two apertures therein spaced for each other and located on opposite sides of the junction between the two members being connected by the connector assembly at the junction, said bearing piece engaging one of said wall means of each of the two members on opposite sides of the junction and adjacent said apertures, and said connector assembly including at least two bearing pad means, each bearing pad means including a bearing pad portion engaging the other of said wall means of one of said members, and each bearing pad means including a locating stem received in one of said apertures of the connector bearing piece, the stem having a tool receiver therein;
    said bearing piece and bearing pad means having cooperating cam and follower means thereon operable by a tool when received in the tool receiver of the stem of the bearing pad means to tighten and loosen the connector assembly between the said facing wall means at the junctions.

15. The assembly of claim 14 wherein:
said bearing piece has said cam means therein and said bearing pad means have said cam follower means therein.

16. The assembly of claim 15 wherein:
said cam means are a pair of ramps formed in said bearing piece on the opposite sides of said apertures and engaging said cam follower means of said bearing pad means.

17. The assembly of claim 16 wherein:
said cam follower means include a pair of lugs on said bearing pad means extending radially outward from said stem.

18. The assembly of claim 17 wherein:
said bearing pad means include a flange portion having said bearing pad portion on one face thereof and said stem projecting from the other face thereof and said lugs projecting from said other face thereof.

19. The assembly of claim 18 wherein:
said apertures and locating stems are circular and sized for fitting reception of the stems in the apertures for piloting the stems in the apertures during operation of the cam means by operating tool means in the tool receivers.

20. The assembly of claim 19 wherein:
said bearing piece has a planar surface which engages said one of said wall means, and said cam means are arranged for advance of the bearing pad means in a direction transverse to the plane of said planar surface in response to rotation of the bearing pad means one quarter turn about its circular axis, from a condition where the bearing piece and pad are clamped tightly against the facing wall means, to the condition where the bearing piece and pad are unclamped from the facing wall means.

21. The assembly of claim 20 wherein:
each of the members has a front and rear face, the rear face being provided by a pair of spaced co-planar rear flanges which form the said one wall means of the C-shape, the front face of the member being provided by a third flange spaced from said wall means.

22. The assembly of claim 21 wherein:
said rear flanges are parallel and, with the C-shape section, define a slotted rear track in each member;
said bearing piece is located with its apertures in alignment with the slots in the tracks, with said tool receivers facing said slots for access by a tool inserted through said slots.

23. The assembly of claim 22 wherein:
orientation index means are provided on said planar surface and said stems, and oriented to show alignment of the index means on the stem with the index means on the planar surface immediately adjacent the stem upon retraction of the bearing pad means to facilitate assembling and disassembling the assembly.

24. The assembly of claim 23 wherein:
at least one of said bearing pieces is planar; and
said ramps project from a surface of said bearing piece.

25. The assembly of claim 24 wherein:
said one bearing piece is made of cold rolled strip steel, and said ramps are pressed therein.

26. The assembly of claim 25 wherein:
said tool receiver is a screwdriver slot.

* * * * *